Feb. 23, 1943.   J. B. WORTHINGTON ET AL   2,312,294
MICRO-PROJECTOR
Filed Sept. 3, 1940   2 Sheets—Sheet 1

INVENTORS
J. B. Worthington &
BY V. Bartley
L. M. McKnight
ATTORNEY

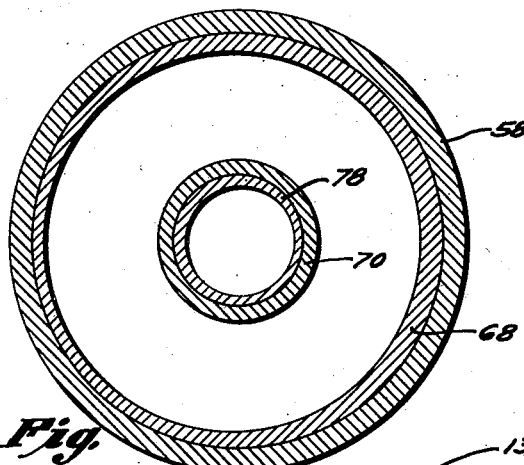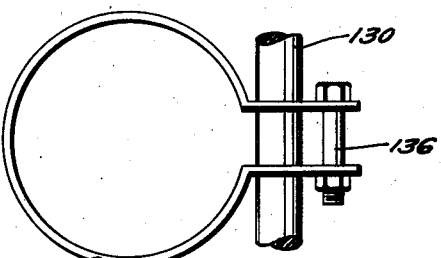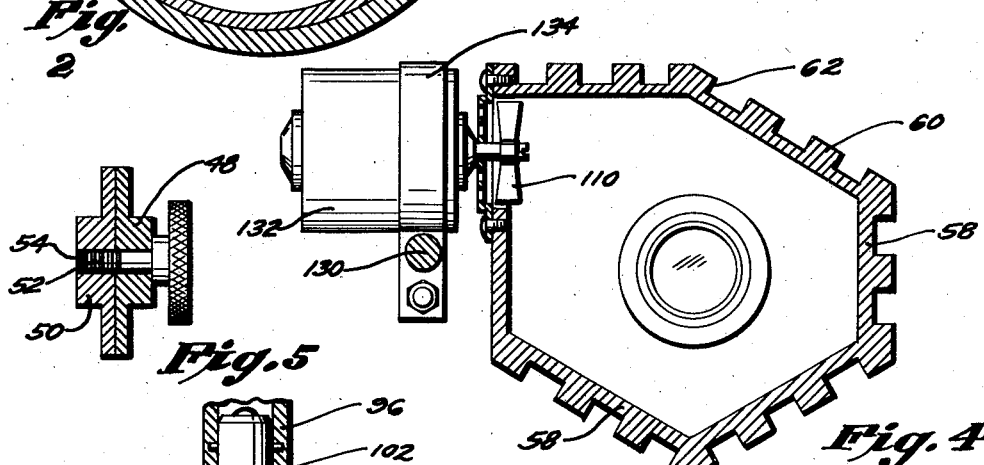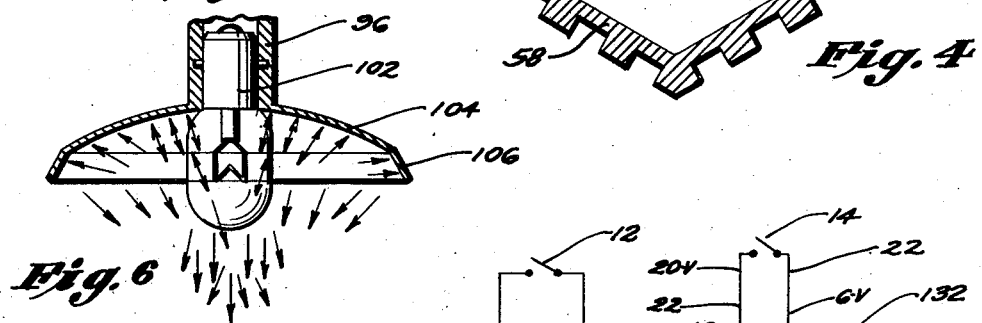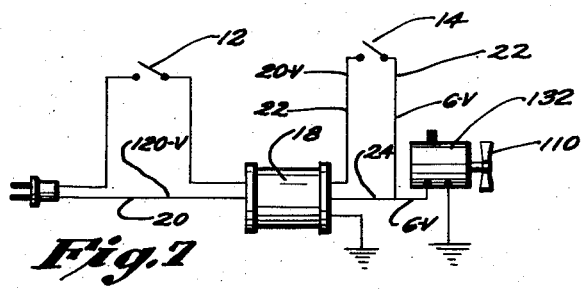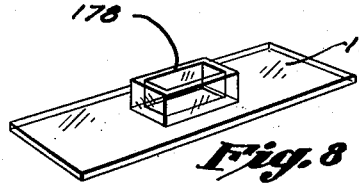

Patented Feb. 23, 1943

2,312,294

UNITED STATES PATENT OFFICE 2,312,294

MICRO-PROJECTOR

James B. Worthington and Victor Bartley, Oklahoma City, Okla.

Application September 3, 1940, Serial No. 355,272

11 Claims. (Cl. 88—24)

This invention relates to an improved micro-projector and more particularly, but not by way of limitation to a micro-projector adapted to provide a semi-polarized light for the enlarged image of a chosen specimen. This invention is a continuation in part of our co-pending application Serial No. 307,322, filed December 2, 1939.

An important object of this invention is to provide a micro-projector whereby still or movable specimens may be enlarged and projected either upon an adjacent underlying plate and having an adjustable knee joint construction so that the specimen may be projected laterally onto a wall screen or the like for conveniently studying the object.

And another object of this invention is to provide a micro-projector having a novel housing for an incandescent lamp of such construction that heat from the lamp is readily dissipated from the housing, and including a fan for circulating air within the housing assisting the dissipation of the heat away from the specimen under examination to facilitate an extensive study thereof.

And still an additional object of this invention is to provide a micro-projector of such construction having an improved housing for an incandescent lamp wherein the lamp is mounted in an eccentric manner so that it can be moved to bring out certain parts of the specimen in line of direct focus for examination, at the same time blanking out the remaining parts of the specimen.

A further object of this invention is to provide a micro-projector having a housing for an incandescent lamp wherein said lamp is eccentrically mounted and cooperates with a reflector to provide an intensified light upon a particular portion of the object to be examined. The housing is of such construction to provide a housing cover carrying the incandescent lamp piston which cover is eccentrically mounted with respect to the housing so as to increase the range of focus providing the intensified light if so desired.

And still a further object of this invention is to provide a micro-projector capable of producing an intensified light to effect a third dimensional projection of the specimen being enlarged in order to provide a better outline of the projection and consequently eliminate considerable strain on the individual's eyes.

And still an additional object of this invention is to provide a micro-projector of such construction that access to all working parts for inspection or replacement is facilitated. Furthermore, a plurality of knobs are separately placed on the lamp housing cover and the lamp piston, which when in alignment provide that the light rays are projected from a neutral position in direct line with the objective as distinguished from the eccentric arrangement providing a concentrated ray.

Other objects and advantages of the invention will be evident from the following detailed description read in conjunction with the accompanying drawings which illustrate one form of my invention.

In the drawings:

Fig. 2 is a view taken on lines 2—2 of Fig. 1 with certain parts omitted for a clarification of the eccentric construction of the lamp piston and lamp housing cover.

Fig. 3 is a detail view in front elevation of the strap supporting the fan.

Fig. 4 is a sectional view taken on lines 4—4 of Fig. 1.

Fig. 5 is a detail view of the knee joint taken on lines 5—5 of Fig. 1 with the knurled screw shown in elevation.

Fig. 6 is an enlarged detail view of the reflector and lamp socket showing the direction of the reflected light rays.

Fig. 7 is a schematic view of the electrical wiring arrangement for the instrument.

Fig. 8 is a perspective view of a modified form of the specimen plate.

Fig. 9 is a perspective view of a cover for the specimen view in Fig. 8.

Figure 1:
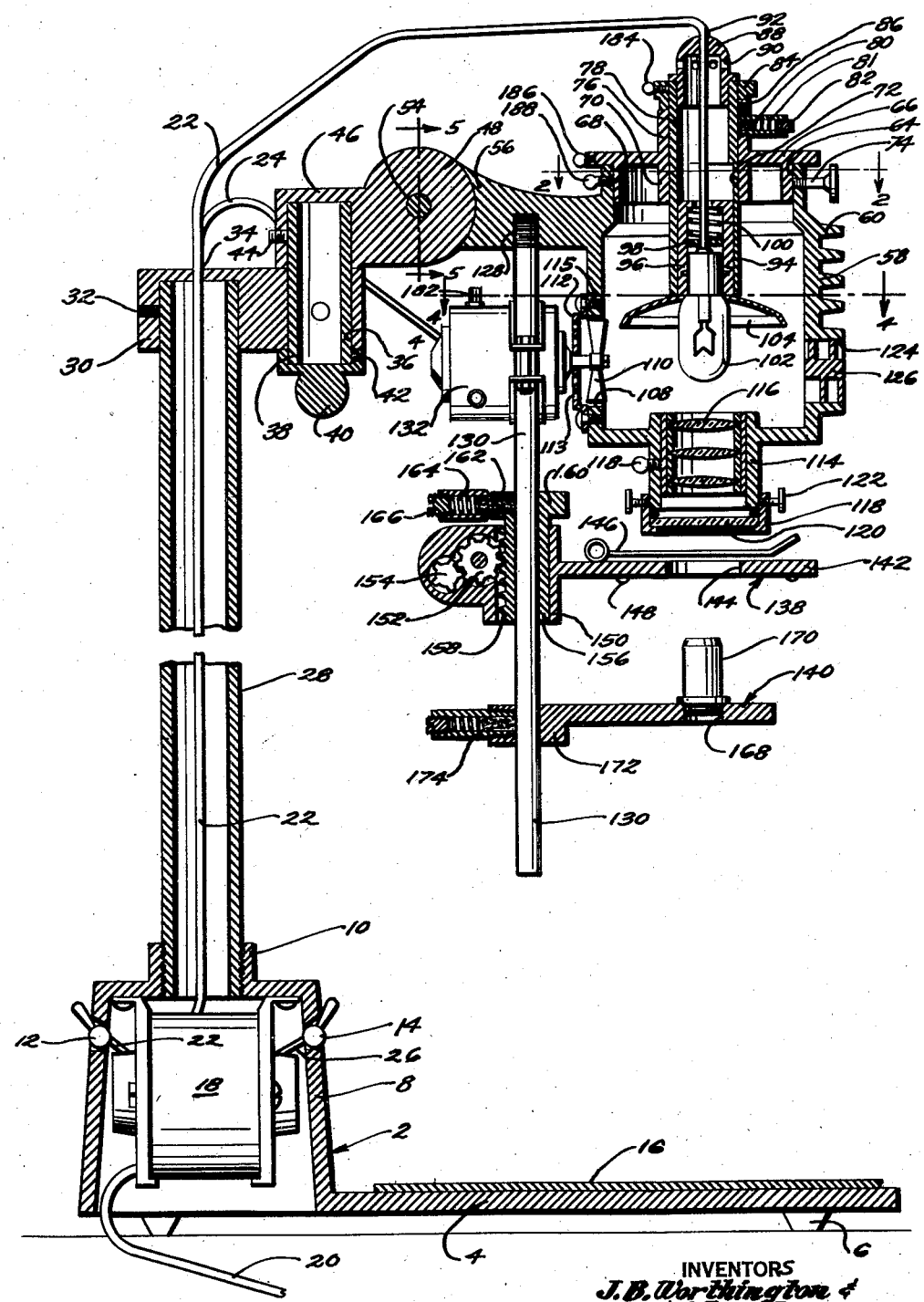
Fig. 1 is a vertical longitudinal section taken through the instrument.

Referring to the drawings in detail and more particularly to Fig. 1, reference character 2 designates the base of the micro-projector which comprises a plate 4 horizontally supported upon suitable feet 6. A portion of the plate is formed or cast to provide an upstanding housing 8 disposed at the back of the base, and is open on its underside as shown. In the central top portion of the housing 8 a threaded bossed opening 10 is formed therethrough. The front and back walls of the housing 8 are each provided with a control switch 12 and 14 respectively.

The horizontal forward position of the base 2 is adapted to receive the plate of porcelain 16 or other suitable white material which may be satisfactorily employed as a screen upon which an enlargement may be projected. The screen 16 is preferably secured to the plate by having its outer marginal edges bent to form guide ribs (not shown), capable of sliding along the outer marginal edges of the plate 2.

The housing 8 is constructed to contain a suitable dual transformer unit 18 for supplying current at a reduced voltage from a standard housing light circuit to the projector lamp and fan to be later described. A conductor wire 20 provides electrical communication for the transformer 18. The main switch 12 is connected with the transformer by wire 22 and controls the supply of electricity to the transformer. The switch 14 is a double toggle switch which can be operated for providing the secondary current of the transformer at either twenty or six volts, as is desired.

Wires 22 and 24 extend from the transformer into communication with the lamp and fan respectively. A wire 26 connects the transformer with switch 12. Referring to Fig. 7, the transformer 18 is shown connected by the line 24 to the fan for supplying six volts thereto, all that is necessary for operation thereof. The switch 12 through line 22 can supply either twenty or six volts to the lamp bulb, depending upon the position of the switch 12. In Fig. 7 the electrical lead line to the lamp is not shown. The lamp and fan are grounded to the frame of the instrument as illustrated so that the circuit will be completed as will be readily understood.

Secured in the bossed opening 10 is a vertically upstanding tubular shaft or standard 28 through which a portion of the wires 22 and 24 passes. The upper end of the standard 28 is provided with a head 30 secured thereto by a suitable set screw 32 and the head 30 is provided with an aperture 32 through which extends the wires 22 and 24. The head 30 projects laterally from the standard 28 and is provided with an aperture 36 in which is secured a sleeve or tubular shaft 38 extending upwardly above the head 30. The lower end of the shaft 38 is closed by a suitable plug 40 secured thereon by a screw 42, and it will be apparent that the sleeve can be adjusted in a rotary path.

From the foregoing it will be apparent that the device does not provide for any vertical adjustment of the projector at this point. However, the standard 28 is of such a height to compensate for any enlargements, and vertical adjustment is made through the elements mounted on the mast to be later described. The upper end of the sleeve 38 has secured thereto by means of a screw 44, a laterally extending arm 46 formed with an enlarged circular portion 48 comprising part of the knee joint shown more clearly in Fig. 5. The portion 48 is adapted to cooperate with a similar portion 52 providing a dual joint held together by a knurl headed screw 52 extending through aligned apertures 54. The knee joint provides for disposition of the lamp and housing in a horizontal plane to project the specimen on a wall or the like. The portion 50 extends laterally to provide an arm 56, the outer end of which is integrally formed with the lamp box housing 58. It will be understood that the housing, although illustrated as integral with the arm 56, may be formed separate therefrom by any suitable means such as that shown in applicant's co-pending application, Serial No. 307,322 heretofore mentioned. The lamp housing 58 is shown in the form of a vertically disposed elongated body of substantially irregular shape in cross section (Fig. 4) to provide an increased space to allow for dissipation of heat by the lamp. The outer periphery of the housing 58 is provided with a plurality of encircling or partially encircling ribs or fins 60.

As clearly shown in Fig. 4, the ribs 60 are intersected by a plurality of spaced vertical grooves 62 which in cooperation with the fins 60 provide for further dissipation of heat from the walls of the housing 58. The upper portion of the lamp housing 58 is provided with an aperture or opening 64 for receiving a lamp box cover 66. The cover 66 is provided with a pair of outwardly depending spaced circular flanges 68 and 70 respectively. The flange 68 is adapted to fit in the opening 66 of the lamp box and is formed slightly eccentric with respect to the concentric opening 72 (Fig. 2) provided by the inner periphery of flange 70. The eccentric arrangement of the flange 68 on the cover 66 will be hereinafter set forth. The cover 66 is held in position in the housing by a suitable screw 74. The flange 70 extends outward from both sides of the cover 66 to provide an upwardly extending portion 76, and an extension of the concentric opening 72. A tubular lamp carrier piston 78 is disposed in the opening 72 and extends vertically downward into the interior of the housing 58. A suitable friction fiber member 80 forced inwardly by a spring 81 and screw 82 holds the tubular cylinder 78 in position. A knurled ring or collar 84 is secured to the top of piston 78 by a screw 86 and acts as a handle for the piston. A suitable cap is fitted in the piston and is provided with ventilator openings 90, and an aperture 92 for receiving wire 22 extending downward through the piston 78 into the lamp socket now to be described.

The lower half portion of the tubular lamp piston 78 is formed to provide an eccentric bore 94 as clearly shown in Fig. 2. The eccentric bore is off set with respect to the outside diameter of the piston 78. A bayonet type lamp socket 96 is arranged in the eccentric lower portion of piston 78, and has a suitable insulation disc 98 receiving wire 22 and urged forwardly toward the outlet end of the socket by a helical spring 100 anchored therein, which is usually maintained partially compressed when the base of the incandescent lamp 102 is secured in the socket 96. The lamp is of any suitable type having a bayonet connection for interfitting in the socket 96. A circular reflector 104 is integrally secured to the lower portion of the socket 96 and extends outwardly therefrom. As clearly shown in Fig. 6, the marginal edges of the reflector 104 are provided with bent or angled portions 106 providing a reflector of different radii for a purpose as will be hereinafter set forth.

The horizontal back portion of the housing 58 is provided with an aperture 108 for receiving the circular fan 110 for a purpose as will be hereinafter described. The aperture 108 is covered by a plate 112 in which the apertures 113 are formed at angles in order to admit air, yet exclude direct light rays. The plate is secured to the housing by screws 115. The lower end of the housing 58 is formed to provide an axially directed sleeve 114 in which is secured a suitable lens system 116 by means of screw 118. It is to be understood that the aperture provided by the sleeve 114 is in substantially axial or vertical alignment with the concentric aperture 72 of the cover plate 66. A circular collar 118 containing a heat radiating disc 120 is secured to the lowermost end of sleeve 114 by a plurality of circumferentially spaced screws 122. The disc 120 retards head of the lamp away from the specimen and allows for an extensive study thereof. The forward side portion of the housing 58 is provided with an aperture 124 for receiving a circular baffle member 126 allowing for the discharge of air from the housing. The arrangement of the baffle is such that it precludes light rays.

The arm 56 is provided with a suitable threaded socket 128 which is directed downward along a path parallel with the axis of the lens 116 and in which is secured one end of a supporting post or mast 130. As clearly shown in Fig. 3, the motor 132 for the fan 110 is supported by a strap or band 134 suitably held or clamped on the mast 130 by a bolt 136. A specimen stage 138 is supported on the mast 130 directly beneath the lens system 116, and immediately below the specimen stage an objector stage 140 is supported on the mast 130.

The specimen stage comprises a flat body 142 having a central aperture 144, and on top of the body at opposite sides of the aperture are secured the specimen plates securing springs 146 (only one of which is shown). On the undersides of the specimen stage are secured spring arms 148 disposed at opposite sides of the aperture 144 and at right angles to the springs 146. These arms are for holding films of 8 mm. size.

A sleeve 150 is formed integral with the specimen stage plate 142 and has an axis parallel with the axis of aperture 144. This sleeve has an enlarged back portion in which are housed a pair of gear pinions 152 and 154 meshed with one another, and the pinion 152 has its periphery projecting into the sleeve 150 while the pinion 154 is carried on a shaft supporting a knurled adjusting wheel, neither of which is shown. The sleeve 150 receives an inner sleeve 156 through which the mast 130 extends, and the sleeve 156 is provided with a longitudinally extending tooth rack 158 with which the pinion 152 meshes. The upper end of the rack sleeve 156 is provided with a head 160 which carries a brake comprising a frictional member 162 forced inwardly by a spring 164 and screw 166 for engaging the mast 130 and holding the rack sleeve and specimen stage on the mast. It will be apparent that by the friction brake a rough vertical adjustment of the specimen stage may be made and after completing such rough adjustment, a fine adjustment of the stage can be made through the rack or pinion means.

The objective stage 140 consists of a flat body horizontally disposed, and has a plurality of apertures 168 (only one of which is shown) for supporting an objective unit 170. It will be understood that a plurality of objective units (preferably three) may be supported in the apertures 168. The objective state 140 is provided with an enlarged sleeve portion 172 through which passes the mast 130. A friction brake 174 similar to that utilized for the specimen stage holds the objector stage 140 in position on the mast 130.

The usual flat slide or specimen plate (not shown) is utilized in projecting still specimens. However, in Fig. 8 a modified form of specimen plate is shown when it is desired to project live specimens, especially insects or the like normally living in water, so that observation can be made of the insect's free and natural movements. The plate 176 is provided with a transparent rectangular shaped box 178 secured to the plate by glue or the like. In Fig. 9 is shown a transparent cover 180 for the box 178. It will be apparent that the box can be formed in any shape desired and in a lateral projection of the specimen on a wall or the like an end portion of the box 178 may act as the cover plate.

Operation

In operation when it is desired to project a specimen on the screen 16, the switch 14 controls the supply of electricity from the dual transformer 18 to the lamp 102, whether it be twenty or six volts required. A switch 182 controls operation of the fan 110. The collar 84, cover plate 66 and lamp housing 58 are each provided with screws 184, 186 and 188 respectively, which when in vertical alignment project a direct ray centrally focused from lamp 102 through lens 116 to the specimen stage 142. It will be understood in this type of projection that the lamp piston 78 is in its lowermost downward position as determined by collar 84 contacting the top of flange 76. The direct ray provides a pure white intense circle of light for observing an over all view on the screen 16. It will be understood that the fan 110 is circulating air in the interior of the housing 58 to be discharged through baffle 126. The circulation of cool air cooperating with the cooling fins 60 of the housing 58, and the heat radiating disc 120 provides a substantially cool light ray to allow an intensive study of the specimen on the stage 142.

When it is desired to observe a particular part of a specimen, the light can be moved within the optical axis of the objective to disclose any part of the specimen with a substantially concentrated ray of light. This eliminates moving the specimen plate for this purpose. The eccentric arrangement of the lamp piston 78 cooperating with the angled rim 106 of the reflector 104 creates a concentrated ray of light, in that upon vertical upward movement of the adjustable piston 78 the eccentricity of the piston allows focusing of the ray at a particular part of the specimen desired to be observed, simultaneously blanking out the remaining parts. This movement of the piston 78 in cooperation with the reflector directs the light rays reflected from the rim 106 of the reflector 104 at one angle so that they straighten or bend the reflected rays from the main body of reflector 104 in order that the light rays are directed into the lens 116 in a converging vertical and lateral concentrated condition. The eccentric arrangement of the lamp housing cover 66 allows for increasing the range of focus of the concentrated ray by merely loosening screw 74 and rotating cover 66 as desired.

From the foregoing it will be readily apparent that the micro-projector herein described is of a simple and compact construction for facilitating access to the working parts for inspection, replacement or the like, and that the projector can by adjustment in conformity to the alignment of screws 184, 186 and 188 supply an over all direct ray of intense white light, or by adjustment of piston 78, a concentrated light to a particular part of the specimen being enlarged, while simultaneously blanking out the remaining parts of the specimen, in order to eliminate eye strain and the like, and present a better disclosure of the object. The light rays can be laterally varied with respect to the normal optical axis to include a larger portion of the particular part of the specimen being observed. The projector is of such construction that circulating cool air is present in the lamp housing which in conjunction with the radiating fins of the housing and heat retarding discs dissipates considerable heat created by the lamp so that an extensive study of a specimen can be made.

Furthermore, the knee joint construction allows for adjustment of the lamp box housing to direct a ray of light against a specimen in a horizontal plate so that a projection may be made upon a wall or similar vertical screen without the use of a reflecting mirror or other similar device for this purpose. The use of the glass receptacle for live specimens allows for a horizontal projection of such object. Furthermore, the disposition of the mast in addition to acting as a support for the specimen and objector stage, also becomes a support for the fan motor utilized in providing a cooling system to the lamp box housing.

The projector utilizes a dual transformer projecting a selective secondary voltage controlled by a two way toggle switch in order to provide an economical use of voltage to the lamp in accordance with the particular projection desired.

Changes may be made in the combination and arrangement of parts as heretofore set forth in the specification and shown in the drawings, it being understood that any modification in the precise embodiment of the invention may be made within the scope of the following claims without departing from the spirit of the invention.

What we claim is:

1. In a micro-projector including a housing, an adjustable piston vertically arranged therein, a lamp carried by the piston, a condenser lens adapted to cooperate with the lamp, an objective mounted to cooperate with the lens, a specimen stage mounted to cooperate with the lens and objective, a reflector for the lamp, said reflector having an angled outer rim portion directing the reflected light of the lamp into the lens in a converging vertical and lateral condition.

2. In a micro-projector including a housing, ean eccentrically mounted cover therefor, an adjustable piston carried thereby, an eccentric bore provided in the piston and adapted to receive a lamp socket, a lamp disposed in the socket, a reflector carried by the lamp socket, a lens adapted to cooperate with the lamp, said reflector responsive to an adjustment of the piston to direct a converging vertical and lateral rays of light to the lens, and said cover adjustable to laterally vary the focus of the reflected light.

3. In a micro-projector including a housing, a cover therefor, an adjustable cylinder carried by the cover, a lamp carried by the cylinder, a condenser lens adapted to cooperate with the lamp, an objective mounted to cooperate with the lens, a specimen stage, a specimen supported by the stage, and means responsive to movement of the cylinder for directing the lamp rays to a limited portion of the specimen and simultaneously blanking out the remaining portions of the specimen, and means cooperating with the last mentioned means to provide a concentrated light, said cover adjustable to laterally vary the rays on the specimen.

4. A micro-projector including a housing, an adjustable piston carried thereby, a lamp carried by the piston, a condenser lens adapted to cooperate with the lamp, a mast arranged in parallel alignment with the lens, a circulating fan providing air for the housing, a fan motor supported by the mast, a light precluding means carried by the housing for emitting air, said housing provided with radiating fins formed by horizontal and vertical grooves adapted to cooperate with the fan for dissipating heat from the lamp.

5. A micro-projector including a housing, an adjustable piston carried thereby, a lamp carried by the piston, a condenser lens adapted to cooperate with the lamp, a mast arranged in parallel alignment with the lens, a circulating fan providing air for the housing, a fan motor supported by the mast, a light precluding means carried by the housing for emitting air, said housing provided with radiating fins formed by horizontal and vertical grooves adapted to cooperate with the fan for dissipating heat from the lamp, and means providing a semi-polarized light to the lens.

6. In a micro-projector including a housing, an aperture in the uppermost portion thereof, a cover plate eccentrically arranged in the aperture, a centrally disposed aperture in the cover plate, an adjustable cylinder arranged in the cover aperture, means for adjusting the cylinder, an eccentric bore provided in the cylinder, a lamp socket arranged in the eccentric bore, a lamp disposed in the socket, a reflector carried by the lamp socket, a lens adapted to cooperate with the lamp, an objective mounted to cooperate with the lens, a specimen stage mounted to cooperate with the lens and objective, a specimen supported by the stage, said lamp responsive to a vertical and rotative adjustment of the cylinder to direct a ray of light to a limited portion of the specimen while simultaneously blanking out the remaining portions of the specimen, said cover plate rotatably adjustable to laterally vary the light ray emitting from the lamp.

7. In a micro-projector including a housing, an aperture in the uppermost portion thereof, a cover plate eccentrically arranged in the aperture, a centrally disposed aperture in the cover plate, an adjustable cylinder arranged in the cover aperture, means for adjusting the cylinder, an eccentric bore provided in the cylinder, a lamp socket arranged in the eccentric bore, a lamp disposed in the socket, a reflector carried by the lamp socket, a lens adapted to cooperate with the lamp, an objective mounted to cooperate with the lens, a specimen stage mounted to cooperate with the lens and objective, a specimen supported by the stage, said lamp responsive to a vertical and rotative adjustment of the cylinder to direct a ray of light to a limited portion of the specimen while simultaneously blanking out the remaining portions of the specimen, said cover plate rotatably adjustable to direct the light ray emitting from the lamp laterally of the normal optical axis, said reflector provided with different radii responsive to movement of the piston to direct light into the lens in a substantially concentrated condition.

8. In a micro-projector including a housing, an aperture in the uppermost portion thereof, a cover plate eccentrically arranged in the aperture, a centrally disposed aperture in the cover plate, an adjustable cylinder arranged in the cover aperture, means for adjusting the cylinder, an eccentric bore provided in the cylinder, a lamp socket arranged in the eccentric bore, a lamp disposed in the socket, a reflector carried by the lamp socket, a lens adapted to cooperate with the lamp, an objective mounted to cooperate with the lens, a specimen stage mounted to cooperate with the lens and objective, a specimen supported by the stage, said lamp responsive to a vertical and rotative adjustment of the cylinder to direct a ray of light to a limited portion of the specimen while simultaneously blanking out the remaining portions of the specimen, said cover plate rotatably adjustable to laterally vary the light ray emitting from the lamp, said reflector responsive to movement of the piston to direct light into the lens in converging vertical and lateral condition, and separate means carried by the housing, cover and piston and adapted when in alignment to indicate a neutral light.

9. In a microscope projector comprising a base having a horizontally disposed flat portion and a housing at one side of the flat portion, a vertically disposed tubular standard secured at one end in the top of said housing and extending vertically therefrom, a head secured to the upper end of the standard and having a vertically disposed guide therethrough, a sleeve secured in the guide and maintained in parallel relation with the standard, an elongated vertically disposed lamp housing secured to the upper end of the sleeve, and means providing for adjustment of the lamp housing in a horizontal plane.

10. In a microscope projector comprising a base having a horizontally disposed flat portion and a housing at one side of the flat portion, a vertically disposed tubular standard secured at one end in the top of said housing and extending vertically therefrom, a head secured to the upper end of the standard and having a vertically disposed guide therethrough, a sleeve secured in the guide and maintained in parallel relation with the standard, an outwardly depending arm secured to the sleeve, a second arm cooperating with the first mentioned arm to form an adjustable joint, a vertically disposed lamp housing secured to the second arm, said joint capable of adjustment for moving the housing to a horizontal plane.

11. In a micro-projector including a housing, an adjustable piston arranged therein, a lamp carried by the piston, a condenser lens adapted to cooperate with the lamp, an objective mounted to cooperate with the lens, a specimen stage, a specimen supported by the stage, reflector means so constructed and arranged in response to axial rotative movement of the piston to provide a concentrated two-power ray of light to the specimen, and means eccentrically adjustable to laterally vary the ray of light with respect to the specimen.

JAMES B. WORTHINGTON.
VICTOR BARTLEY.